United States Patent
Han

(10) Patent No.: US 7,642,005 B2
(45) Date of Patent: Jan. 5, 2010

(54) BATTERY PACK

(75) Inventor: Kyu-Nam Han, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1050 days.

(21) Appl. No.: 10/923,749

(22) Filed: Aug. 24, 2004

(65) Prior Publication Data

US 2005/0053829 A1 Mar. 10, 2005

(30) Foreign Application Priority Data

Sep. 9, 2003  (KR) .................. 10-2003-0063137

(51) Int. Cl.
*H01M 10/00* (2006.01)
*H01M 2/10* (2006.01)

(52) U.S. Cl. .................... 429/122; 429/99; 429/100; 429/96

(58) Field of Classification Search ............... 429/122, 429/99, 100, 96
See application file for complete search history.

(56) References Cited

U.S. PATENT DOCUMENTS 5,744,260 A * 4/1998 Sim ........................... 429/99

FOREIGN PATENT DOCUMENTS

| JP | 59-068167   | 4/1984  |
|----|-------------|---------|
| JP | 11-127166   | 8/1989  |
| JP | 05-251075   | 9/1993  |
| JP | 05-290821   | 11/1993 |
| JP | 09-219182   | 8/1997  |
| JP | 10-106520   | 4/1998  |
| JP | 2000-100401 | 4/2000  |
| JP | 2004-362879 | 12/2004 |
| JP | 2006-522995 | 10/2006 |

* cited by examiner

*Primary Examiner*—Patrick Ryan
*Assistant Examiner*—Helen O. K. Chu
(74) *Attorney, Agent, or Firm*—Robert E. Bushnell, Esq.

(57) ABSTRACT

A battery pack includes a case having an inner space, a plurality of battery cells placed inside the case, and at least one spacer placed between the battery cells. A space is formed around a supporting portion of the spacer for the battery cells so as to allow heat generated by the battery cells to flow out of the case. The spacer supports the battery cells by line contact therewith. The spacer body is formed in the shape of an H beam or in the shape of a staircase.

12 Claims, 3 Drawing Sheets

BATTERY PACK

CLAIM OF PRIORITY

This application makes reference to, incorporates the same herein, and claims all benefits accruing under 35 U.S.C. §119 from an application for BATTERY PACK earlier filed in the Korean Intellectual Property Office on 9 Sep. 2003 and there duly assigned Ser. No. 2003-0063137.

BACKGROUND OF THE INVENTION

1. Technical Field

The present invention relates to a battery pack and, more particularly, to a spacer placed between battery cells when making a battery pack.

2. Related Art

Unlike the primary battery, the secondary battery may be recharged, and may be made into a battery pack and used as the power source for various portable electronic devices such as cellular phones, laptop computers, and camcorders.

In particular, the lithium secondary battery among the secondary batteries is more suitable for portable electronic devices since it has a high driving voltage and a high energy density per unit weight. The lithium polymer battery is a type of lithium battery which uses polymer electrolytes, and has the advantage of making portable electronic devices slim and lightweight because it is flexible so as to form various shapes, and its weight is light.

Generally, the battery pack includes battery cells which are prepared separately, a case receiving the battery cells, and a spacer placed between the battery cells when a plurality of the battery cells are placed inside the case.

The spacer is placed between the battery cells to prevent electrical contact between the battery cells, and the spacer supports both sides of the battery cell when the battery cells are placed inside the case so that it plays a role in making the battery cells tightly fixed.

The spacer which has been suggested or used for the battery pack up to the present is devised so as to have a contact area with the battery cell which is as large as possible. This enables the spacer to support the battery cells by area contact so that more supporting power is added to the battery cells so as to fix the battery cells more tightly.

Accordingly, by way of example, when the battery cell has a cylindrical shape, the spacer has a curved surface corresponding to the circumferential surface of the battery cells so as to contact the outer surface of the cylindrical battery cell. One example of such a technology is described in Japanese Patent Laid-Open No. 5-290821.

However, such battery packs have a problem in that the life of the battery cell is decreased due to the fact that heat generated by the battery cells disposed inside the case cannot easily flow out of the case. That is, since the conventional battery pack, as described above, has a structure such that the spacer disposed inside the case is in close contact with the battery cells, it has an advantage in terms of support of the battery cells. However, since there is no passage through which the heat generated by the battery cells can flow out of the case, the heat remains inside the case and has a harmful effect on the battery cells.

Accordingly, the consumer who uses an electronic device having the secondary battery as the power source suffers inconvenience in using the electronic device because it cannot be sufficiently supported by the power source of the secondary battery.

SUMMARY OF THE INVENTION

In one exemplary embodiment of the present invention, there is provided a battery pack in which the heat generated from the battery cells easily flows out of the case, and in which the plurality of battery cells disposed inside the case are supported tightly when the battery pack is made.

According to one aspect of the present invention, the battery pack includes a case having an inner space, a plurality of battery cells disposed inside the case, and at least one spacer disposed between the battery cells, and a space is formed around a supporting portion of the spacer(s) for the battery cells to allow the heat generated by the battery cells to flow out of the case.

According to another aspect of the present invention, the battery pack includes a case having an inner space, a plurality of battery cells disposed inside the case, and at least one spacer disposed between the battery cells, wherein the spacer supports the battery cell by line contact with the battery cells.

The spacer includes a body having a supporting portion for contacting and supporting the battery cells, and the spacer can be formed such that the cross-section of the supporting portion of the spacer is perpendicular to the longitudinal direction of the battery cell when the spacer is mounted inside the case and has a staircase shape. In that case, the body can be formed in the shape of an H beam.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

An exemplary embodiment of the present invention will now be described in detail with reference to the accompanying drawings.

Figure 1:
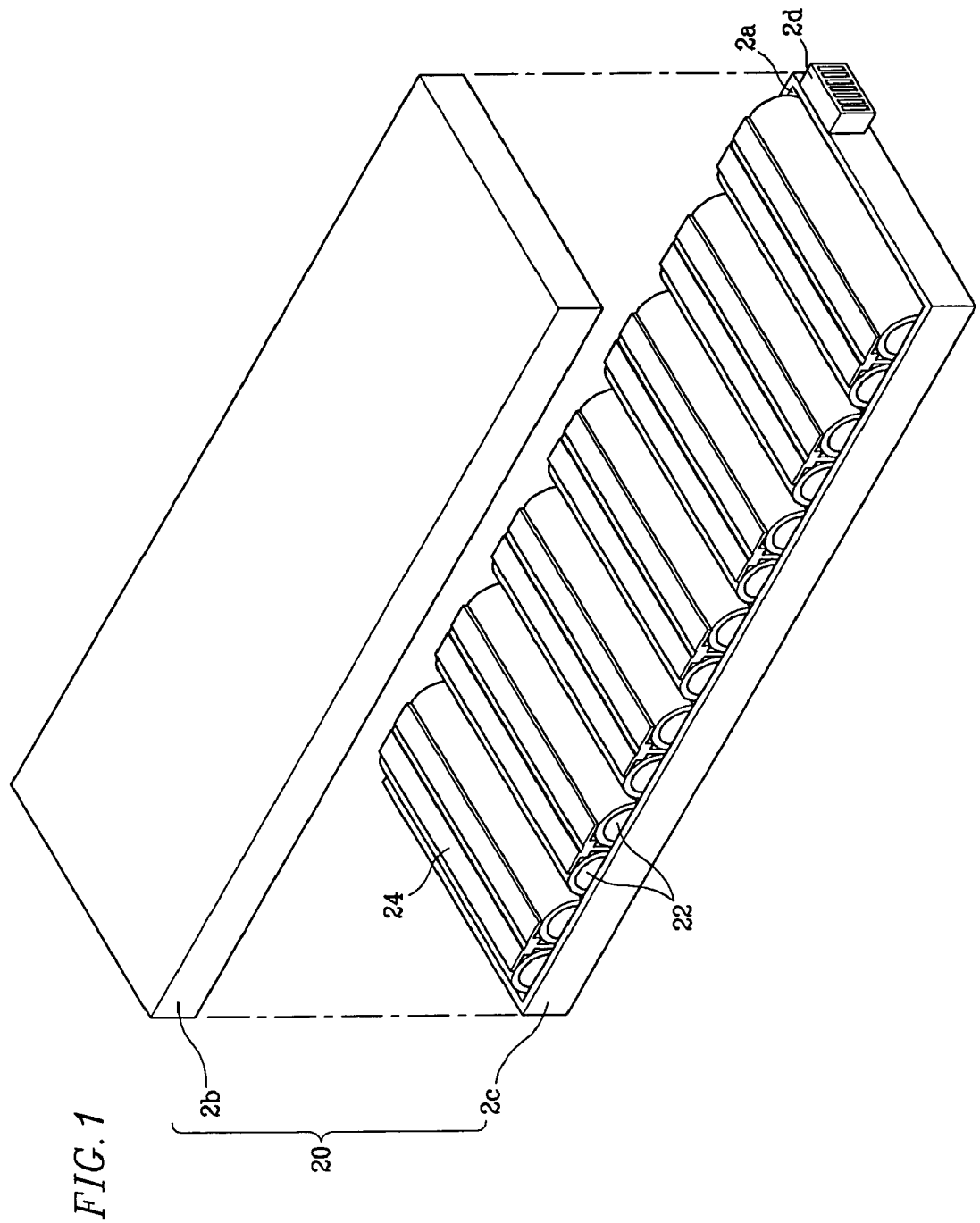
FIG. 1 is an exploded perspective view of a battery pack according to an embodiment of the present invention.

FIG. 1 is an exploded perspective view of a battery pack according to an embodiment of the present invention. The battery pack shown in the figure is a battery pack for laptop computers. However, it is an exemplary embodiment and, accordingly, the present invention is not limited to the disclosed exemplary embodiment. That is, the present invention can be used as the battery pack for various other electronic devices. Although the battery cell with a cylindrical shape is given below as an example, the present invention is not limited to the following example.

As shown in the figure, the battery pack according to the present invention includes a case 20 having an inner space 2a of a predetermined size. In the embodiment of the present invention, the case 20 has an upper case 2b and a lower case 2c, both of which are assembled into one body, and the case 20 receives a plurality of battery cells 22 inside the inner space 2a when the upper case 2b and the lower case 2c are detached.

The case 20 has a rectangular shape, and a connector 2d is formed on one of the upper case 2b and the lower case 2c (the lower case for the present embodiment) which electrically connects the battery pack with an electronic device, such as a laptop computer.

The battery cells 22 are secondary batteries prepared separately, for example, cylindrical lithium-ion secondary batteries, a plurality of which are placed in the inner space 2a of the case 20 so as to electrically connect to each other and to connect to the connector 2d. Since the structure for connecting these battery cells is the same as in the general battery packs, the detailed description for this structure is not provided herewith.

Inside the case 20, a spacer 24 which supports the battery cells 22 is mechanically placed between the battery cells 22 so that the battery cells 22 are mounted stably inside the case 20. In addition, the spacer 24 prevents electrical contact between each other of the battery cells.

Figure 2:
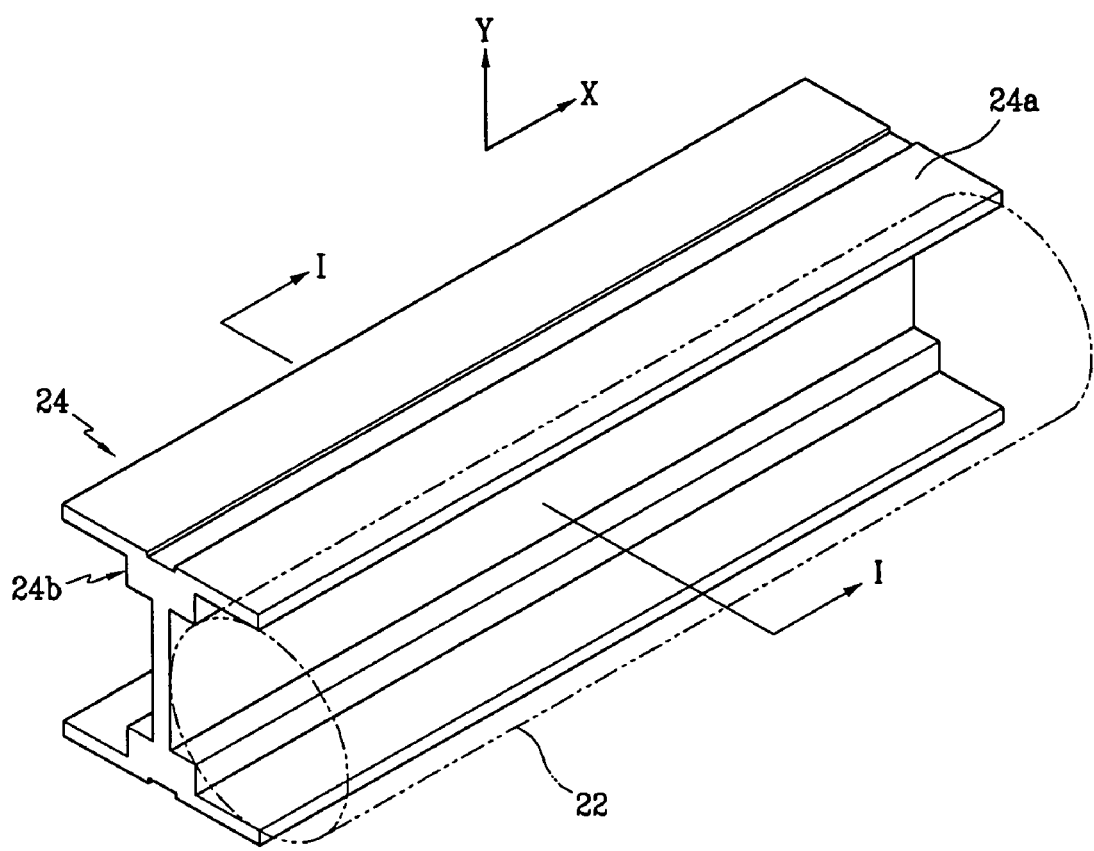
FIG. 2 is a perspective view of a spacer of the battery pack according to the embodiment of the present invention.

Since the spacer 24 supports the side corresponding to the longitudinal direction of the battery cells 22, that is, the circumferential area of the battery cells 22, when the battery cells 22 are received inside the case 20, the spacer 24 has a body 24a (see FIG. 2) which is formed with a long shape along the longitudinal direction of the battery cells 22.

Moreover, in the present invention, the spacer 24 has a structure to support the battery cells 22 by line contact therewith. Accordingly, the body 24a of the spacer 24 has the shape of an H beam, and is formed such that the cross-section of a supporting portion 24b contacts and supports the battery cells having a staircase shape (FIG. 3).

Figure 3:
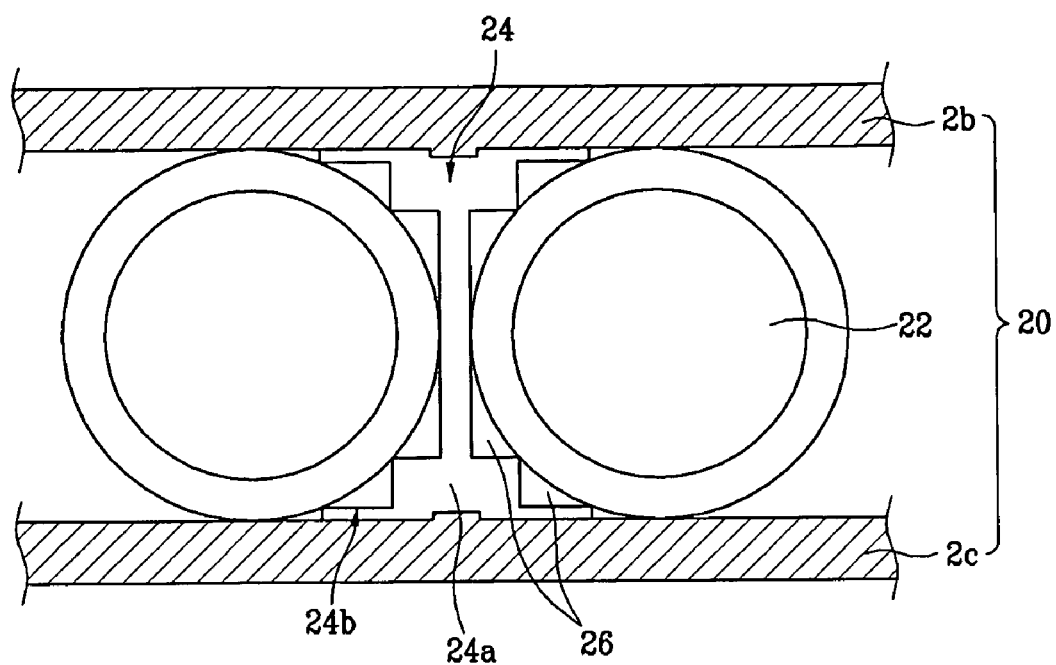
FIG. 3 is a partial sectional view of the battery pack according to the embodiment of the present invention.

The cross-section of the supporting portion 24b is a cross-sectional view cut in the direction Y perpendicular to the longitudinal direction or longitudinal axis X of the battery cells 22 when the battery cells 22 are placed inside the case, As shown in FIG. 3, such a shape enables the spacer 24 to make a space 26 between the battery cells 22 and the supporting portion 24b as the spacer 24 supports the battery cells 22 by line contact therewith inside the case 20 upon fabrication of the battery pack. The space 26 is formed with a long shape between the battery cells 22 and the spacer 24 along the longitudinal direction of the battery cells 22 and the spacer 24.

As the space 26 with a predetermined size is formed between the battery cells 22 and the spacer 24, the space 26 serves as an air flow passage which allows the heat generated by the battery cells 22 to flow out of the case 22 when the battery pack is used as a power source for a laptop computer.

That is, when heat is generated from the reaction of the battery cells, the rising air due to the heat does not remain between the battery cells 22 and the spacer 24, but instead it is guided by the space 26 to flow out of the case 20. Then, it is preferable that a vent hole be formed on the case 20 to easily drain the air, but this is not shown in the figures.

In the meantime, in accordance with the present embodiment, although it is described that the supporting portion 24b of the spacer 24 supports the battery cells 22 by line contact, the spacer 24 according to the present invention can also have a structure wherein it supports the battery cells 22 by point contact as well as line contact.

As described above, in the battery pack of the present invention, the spacer 24 contacting and supporting the battery cells 22 provides a space 26 with respect to the battery cells 22 while supporting the battery cells 22.

Accordingly, when heat is generated by the battery cells 22, the battery pack of the present invention allows the heat to flow out of the case 20 through the space 24 so as to enable the battery cells 22 to work without heat damage.

Therefore, the battery pack of the present invention can prevent the battery from decreasing its life and thereby consumers can use portable electronic devices for a long time.

Although preferred embodiments of the present invention have been described in detail hereinabove, it should be clearly understood that many variations and/or modifications of the basic inventive concept herein taught which may appear to those skilled in the art will still fall within the spirit and scope of the present invention, as defined in the appended claims.

What is claimed is:

1. A battery pack, comprising:
    a case having an inner space;
    a plurality of battery cells disposed inside the case; and
    at least one spacer disposed between the battery cells;
    wherein a space is formed around a supporting portion of said at least one spacer to allow heat generated by the battery cells to flow out of the case.

2. The battery pack of claim 1, wherein said at least one spacer comprises a body which includes the supporting portion, said supporting portion contacting and supporting the battery cells, said at least one spacer being formed such that a cross-section of the supporting portion of said at least one spacer is perpendicular to a longitudinal direction of the battery cells when said at least one spacer is mounted inside the case.

3. The battery pack of claim 2, wherein the body of said at least one spacer is formed in one of a shape of an H beam and a staircase shape.

4. The battery pack of claim 1, wherein said at least one spacer is formed in one of a shape of an H beam and a staircase shape.

5. A battery pack, comprising:
    a case having an inner space;
    a plurality of battery cells disposed inside the case; and
    at least one spacer disposed between the battery cells;
    wherein said at least one spacer supports the battery cells by contact with the battery cells; and
    wherein said at least one spacer contacts the battery cell along line parallel to a longitudinal axis of the battery cells said at least one spacer being shaped so as to form at least one space between said at least one spacer and the battery cells, whereby heat generated by the battery cells is permitted to flow out of the case.

6. The battery pack of claim 5, wherein said at least one spacer includes a body having a supporting portion which contacts and supports the battery cells, and said at least one spacer is formed such that a cross-section of the supporting portion of said at least one spacer is perpendicular to a longitudinal axis of the battery cells when said at least one spacer is mounted inside the case.

7. The battery pack of claim 6, wherein the body is formed in one of a shape of an H beam and a staircase shape.

8. The battery pack of claim 5, wherein said at least one spacer is formed in one of a shape of an H beam and a staircase shape.

9. A battery pack, comprising:
    a case having an inner space;
    a plurality of battery cells disposed inside the case; and
    at least one spacer disposed between the battery cells;
    wherein said at least one spacer comprises a supporting portion which is shaped so as to provide at least one gap between the battery cells and the supporting portion, whereby to allow heat generated by the battery cells to flow out of the case through said at least one gap.

10. The battery pack of claim 9, wherein a cross-section of the supporting portion of said at least one spacer is perpendicular to a longitudinal axis of the battery cells when said at least one spacer is mounted inside the case.

11. The battery pack of claim 10, wherein said at least one spacer is formed in one of a shape of an H beam and a staircase shape.

12. The battery pack of claim 9, wherein said at least one spacer is formed in one of a shape of an H beam and a staircase shape.

* * * * *